United States Patent [19]

Haasl et al.

[11] Patent Number: 5,256,716
[45] Date of Patent: Oct. 26, 1993

[54] COATING FOR FOAMS AND PLASTICS

[75] Inventors: Scott Haasl, Coon Rapids; Mark Kenow, Circle Pines, both of Minn.

[73] Assignee: PDI, Inc., Circle Pines, Minn.

[21] Appl. No.: 569,437

[22] Filed: Aug. 20, 1990

[51] Int. Cl.$^5$ .............................................. C08L 91/06
[52] U.S. Cl. .................................... 524/279; 524/277; 524/297; 524/376; 524/385
[58] Field of Search ............... 524/297, 277, 385, 376, 524/249

[56] References Cited

U.S. PATENT DOCUMENTS

| | | | |
|---|---|---|---|
| 3,676,391 | 7/1972 | De Ross | 524/464 |
| 4,238,542 | 12/1980 | Burley | 428/58 X |
| 4,339,365 | 7/1982 | Becher et al. | 523/400 |
| 4,384,056 | 5/1983 | Schmidt et al. | 523/221 |

Primary Examiner—Joseph L. Schofer
Assistant Examiner—J. M. Reddick
Attorney, Agent, or Firm—Haugen and Nikolai

[57] ABSTRACT

A coating formulation for secure bonding attachment to surfaces of resilient or flexible articles, including plastic foam articles and comprising a highly adherent and coherent water-based film forming mixture for coating the surface of flexible foam articles. The working solution of the coating preferably has a formulation containing:

Component

Acrylic emulsion;
Plasticizer;
Coalescing agent;
Polyacrylate thickener/rheology modifier;
Defoamer;
Surfactant;
Ammonium hydroxide; and
Water.

The working solution is applied to the surfaces of the article being treated and the water solvent which is present evaporates at a significantly rapid rate in the ambient to form a thick coating having a substantially dry outer surface. The film remains securely bonded to the article even though flexed and otherwise roughly treated.

1 Claim, No Drawings

COATING FOR FOAMS AND PLASTICS

BACKGROUND OF THE INVENTION

The present invention relates generally to an improved coating formulation, and more particularly to a water-based film former which may be applied to a variety of surfaces through a variety of application techniques or systems, and which is capable of forming a thick coating with highly desirable adherent and coherent properties. The uncured material is highly adherent to the surface upon which it is applied while it remains in liquid state. Once 10 the material has been applied and permitted to cure, the residual thick coating or film possesses sufficiently high cohesive strength so as to render the dried film extremely tough and durable, and with sufficiently high adhesive strength so as to render the coating resistant to peel or other premature failure or release. When the coating material has dried or otherwise cured through reaction and solvent (water) removal, a durable, pliable, and yet tough coating is created. This coating is created without premature surface curing or skinning which would otherwise impede the loss of excess solvent from an uncured core. This coating has been found highly adaptable for application to flexible articles, particularly articles fabricated from plastic, including plastic in foam form. Application techniques for the adhesive while in liquid form are wide and varied, and may include dipping, brush application, or spray application. Coatings of from as thin as about 2 mils but preferably from about 8 mils in thickness and up to about 12 to 15 mils may be obtained with a single dipping of an article into the formulation.

In the preparation of conventional coating formulations, it is generally desired that the film forming layer, particularly when in cured form, have appropriately matched adhesive and cohesive properties. Normally, theses properties are matched so that the bond which is formed by the adhesive material preferably fails due to simultaneous failure of both its adhesive and its cohesive properties. At the same time, it is generally desirable that the conventional film possess a relatively high peel strength. The formulations of the present invention are designed to possess high adhesive and cohesive strength so as to provide for coating and/or film durability. Additional features of the formulations of the present invention include the characteristic of preparing reliable coatings through dipping of foam plastic articles, thereby facilitating the coating of these otherwise difficult-to-coat articles. The desirable adhesive quality of the materials of the present invention appear to make these coating operations possible. By way of example, the consistency of the liquid coating material permits coating of the object being coated in single or multiple dips, with a thick and durable film being prepared thereby. Films having such properties are particularly desirable for the coating of plastic foam articles, with the formulations of the present invention also being desirable for use as film formers for coating other articles, such as rigid metallic articles and the like. Films and coatings formed in accordance with the present invention retain their good physical properties, including flexibility and durability, over extended periods of time.

As indicated above, the coatings of the present invention have wide application to coating of articles fabricated of plastic, including plastic foam articles. These coatings may be employed to form coatings for objects fabricated from polyvinylchloride, polyethylene, including polyethylene foam in lineal, radiated cross-linked and chemically cross-linked form, polypropylene, expanded polystyrene, styrofoam, and the like.

SUMMARY OF THE INVENTION

The formulations of the present invention accordingly have wide utility as film forming materials to prepare thick coatings in a single or multiple operations, and may be formulated so as to permit applying the material by single or multiple dipping a well as by brushing, knife coating, or application with a roller or pad. Because of the wide variety of useful application techniques including dipping, and particularly because of the extremely high adhesive and cohesive strength of the films, the formulations find wide usage and application. Certain distinctions in the individual formulations may accommodate the application technique desired, with these distinctions being based primarily upon differences in the adhesive solids content and viscosity. In-mold coating applications may also be considered.

In actual use, the film forming formulations of the present invention may be applied to the surface to be coated prior to the removal of the water from the water-based solvent, or while the film forming formulations remain rich in water or otherwise highly ladened with liquid. Previously primed surfaces may be advantageously coated by formulations of the present invention. The preferred application technique is through dipping o spraying. In these instances, the adhesive strength of the bonds which are formed with the film are sufficiently high so as to provide a firm solid bond with the surfaces being coated. Alternatively, the film forming formulation may be applied to a surface, and the solvent, i.e., water, permitted to evaporate therefrom. Upon loss of the excess water, the film forming formulation dries and a coating is formed with a substantially dry outer surface.

Because of the surface bonding and cohesive properties of the relatively thick coatings of the present invention, the formulations are particularly useful when it is desired to coat materials which may be deformed through compression or otherwise, such as articles fabricated of foam. Thus, the material cures and dries to a film which is flexible in nature, but which nevertheless possesses good adhesive and cohesive properties even when relatively thick. It is further noteworthy that the surface of the cured film neither picks up dirt or other solid particles, nor does it transfer from the surface to which it is initially bonded once drying or curing is substantially complete. The coating is further desirable from the standpoint of its reasonable ability to withstand limited subsequent exposure to water, including water containing detergents or the like. Thus, the material may be applied to the surfaces of pool articles which can thereafter be utilized without undergoing rapid deterioration of the film coating. Furthermore, because of the nature of the formulation for the coatings, when the formulation is applied to the surfaces to form a relatively thick coating in a single application, the resultant bulk coating remains both tough and durable, while maintaining its good adherent and coherent properties. Because of these physical properties, the material finds use in connection with packaging of medical equipment, athletic padding and mats, recreational and sporting goods, novelty items, upholstery, furniture, as well as general flotation equipment.

Briefly, in accordance with the present invention, a water-based solvent mixture of film forming solids is prepared, with the mixture containing solids consisting generally of a mixture of acrylic emulsion-based materials, along with a rheology modifier. In addition, water-based adhesive tackifiers having low softening points may be added. By way of further explanation, the following general formulations have been found useful:

| Component | Generic Description | Weight % Range |
|---|---|---|
| Acrylic emulsion | A mixture of monomers including 2-hydroxyethyl acrylate, hydroxypropyl acrylate, methacrylate, and acrylonitrile monomers | 65%-75% |
| Plasticizer | Dibutylphthalate. Dialkyl mixed linear phthalates may be used if desired. Such materials are commercially available | 1%-3% |
| Coalescing agent | Dipropylene glycol methyl ether and ethylene glycol N-butyl ether | 5%-6.5% |
| Polyacrylate thickener/ Rheology modifier | An anionic acrylic emulsion copolymer, the emulsion containing about 28 percent solids and having a specific gravity (25° C.) of 1.106 and a pH of between about 2.1 and 4 | 2.5%-3.5% |
| Dispersing agent | An anionic polymer-type dispersing agent utilized to deflocculate pigments in the system, when a pigment is utilized in the system | .5% |
| Defoamer | A petroleum-base defoamer such as 2-octanol | .5%-.75% |
| Surfactant | An anionic wax emulsion containing Carnauba/ Microwax blend | 5%-10% |
| Pigment, as required. | Conventional pigments may be used to obtain the color desired | 2%-10% |
| Ammonium hydroxide | | .4%-.75%. |

Each of the components as set forth hereinabove is commercially available.

The relatively thick water-based coatings of the present invention may be applied to the surface by a variety of means, preferably by dipping or spraying, although knife coating, brushing, and rolling. Other well-known techniques may also be useful. Because of its capability of providing relatively thick films in a single application, dipping is normally preferred. Either open or closed cell foams may be coated with the materials of the present invention.

Therefore, it is a primary object of the present invention to provide an improved coating formulation which has good adherent, coherent and bulk properties, but at the same time possesses unusually high adhesive strength so as to permit use as a film forming formulation for relatively thick coatings.

It is yet a further object of the present invention to provide an improved coating formulation which is water based, and which adheres well to a variety of surfaces and which provides a highly adherent bond to surfaces upon drying.

Yet a further object of the present invention is to provide a coating formulation which is capable of forming relatively thick coatings, with these coatings being applied to the surface of the article being coated through dipping o other readily available means.

Other and further objects of the present invention will become apparent to those skilled in the art upon study of the following specification and appended claims.

DESCRIPTION OF THE PREFERRED EMBODIMENT

In order to better explain the features of the present invention, the following examples and formulations are given:

GENERAL EXAMPLE I

By way of general example, the following formulation is provided:

| Component | Generic Description | Weight % Range |
|---|---|---|
| Acrylic emulsion | A mixture of methacrylate and acrylonitrile monomers | 74% |
| Plasticizer | Dibutylphthalate | 1.5% |
| Coalescing agent | Propyleneglycol-N-butyl ether | 5.7% |
| Polyacrylate thickener/ Rheology modifier | An anionic acrylic emulsion copolymer the emulsion containing about 28 percent solids and having a specific gravity (25° C.) of 1.106 and a pH of between about 2.1 and 4 | 2.4% |
| Defoamer | A petroleum-base defoamer such as 2-octanol | .7% |
| Ammonium hydroxide | | .6% |
| Water | | 15% |
| Pigment | Light blue (122.72 grams per gallon) manufactured by Hulls American Inc. of Piscataway, NJ, under designation "C-111" | 3.18%. |

(Note: 3.18% pigment to 96.82% of base product above.)

Each of the above components as set forth hereinabove is commercially available.

This formulation had a weight of approximately 8.5 pounds per gallon and was useful for a variety of applications. For preparing the formulation, water together with the defoamer, and acrylic emulsion is added to a mixing drum. With the mixer running at a typical blending speed, ammonia is added slowly to prevent air entrapment. About one-half of the plasticizer is then added to the mixture, after which the polyacrylate thickener/rheology modifier, water and residual plasticizer is added to the mixture.

THE ACRYLIC EMULSION

The acrylic emulsion described hereinabove is available commercially. The materials employed in the General Example above are a typical commercial blend of acrylate and methacrylate monomers, such as those based upon 2-hydroxyethyl acrylate, hydroxypropyl acrylate, methacrylate, and acrylonitrile monomers. The material has a pH of between 9 and 10 and with a solids content of between 44.5% and 45.5%. The specific gravity of the so ids is 1.10. The bulking value of the emulsion is 0.115 gallons per pound, while that of the emulsion solids is 0.109 gallons per pound. One such material is available from Rohm & Haas of Philadelphia, Pa. under the code designation "Rhoplex MV-17". Alternatively, other commercial sources are available to provide these materials.

THE PLASTICIZER

The plasticizer as set forth hereinabove is preferably dibutylphthalate. Also included in the range of useful materials are other dialkylphthalates such as mixed linear alkylphthalates containing primarily dibutylphthalate but with other alkyl chains being present. Dibutylphthalate is available from BASF Corporation, Chemicals Division, of Parsippany, N.J. When dialkyl mixed linear phthalates are employed, the alkyl chain, in addition to dibutylphthalate will contain 7, 9 or 11 carbons in the chain. Mixed linear phthalates are available commercially from BASF Corporation, Chemicals Division, under the code designation "Palatinol 711P". When the diesters are employed, the components present are as follows:

1,2-benzenedicarboxylic acid,
di (C11) ester, branched and linear;
di (C7) ester, branched and linear;
di(C9) ester, branched and linear;
(C7, C9) ester, branched and linear;
(C7, C11) ester, branched and linear;
(C9, C11) ester, branched and linear.

THE POLYACRYLATE THICKENER/RHEOLOGY MODIFIER

The polyacrylate thickener/rheology modifier is also available commercially. These materials are thermoplastic polymers or copolymers of acrylic acid, methacrylic acid, esters of these acids, or acrylonitrile. One form which has been found useful is available from Rohm & Haas Corporation of Philadelphia, Pa. under the code designation "Acrysol ASE-60" or alternatively "Acrysol ASE-95". The physical properties of these components are set forth hereinbelow:

|  | Acrysol ASE-60 | Acrysol ASE-95 |
|---|---|---|
| Appearance: | White milky liquid | White milky liquid |
| Pigment solids: | 28 ± 0.5 | 18 ± 0.5 |
| Ionic charge: | Anionic | Anionic |
| pH (as packed): | 2.1–4.0 | 2.1–4.0 |
| Specific gravity at 25° C.: | 1.06 | 1.06 |
| Density at 25° C., lbs./U.S. gal.: | 8.8 | 8.8 |
| Brookfield viscosity (as packed) at 25° C., cP = (spindle, speed) = | 4 (1/12) | 50 (1/12) |
| Effective equivalent weight of solids: | 218 | 124 |

DEFOAMER

A petroleum-based anti-foam component is utilized. A useful defoamer in these applications is a petroleum-based defoamer such as 2-octanol. It is known that there are a wide variety of such anti-foam materials available, and one that has been found useful in the formulations of the present invention is available commercially from Henkel Corporation of Ambler, Pa. under the code designation "Foamaster 333".

DISPERSANT

The dispersant utilized is an anionic, polymer-type dispersant. While a number of such dispersants may be utilized successfully, that material set forth hereinbelow has been found to be useful. A variety of these materials are commercially available, with one such material useful in the present formulations being available from Rohm & Haas Co. of Philadelphia, Pa. under the code designation "Tamol 731". The physical properties of this material are as follows:

Appearance = clear, pale yellow liquid;
Solids = 25 ±1%;
Specific gravity at 25° C. = 1.104;
Viscosity = F maximum (Gardner-Holt);
pH of 10% aqueous solution = 9.5 to 10.5;
Freezing point = −2° C.

PRIMER

While a primer is not required, improved adhesion may be achieved on polyolefins, particularly polyethylene and polypropylene, when utilized. Suitable primers for these materials are commercially available, particularly when the article being treated is in plastic or plastic foam form.

CURING

The coatings of the present invention may be air-dried to cure, however this cure may be accelerated through the use of heat. Temperatures in the range of approximately 160° F. may be employed to accelerate and otherwise expedite the curing cycle. Such temperatures will assist in removal of the aqueous solvent and will not adversely affect the remaining features in the curing operation. Following cure, top coats may be utilized, if desired, as is conventional in the art. Formulations of top coating materials are, of course, commercially available.

MISCELLANEOUS

As an alternative to the surfactant indicated hereinabove, a wax emulsion of water which includes Carnauba wax and microcrystalline wax in an emulsified system is available from Michelman, Inc. of Cincinnati, Ohio under the code name "Michemlube #188".

Polyesters of adipic acid may employed in the formulations.

When used in combination with appropriately formulated mold release coatings, formulations of the present invention may find application as a mold coating for in-situ fabrication of molded objects.

GENERAL EXAMPLE II

| Component | Generic Description | Weight % Range |
|---|---|---|
| Acrylic emulsion | A mixture of monomers including 2-hydroxyethyl acrylate, hydroxypropyl acrylate, methacrylate, and acrylonitrile monomers | 81.4% |
| Plasticizer | Dibutylphthalate | 3.5% |
| Coalescing agent | Propyleneglycol-N-butyl ether | 5.7% |
| Polyacrylate thickener/ Rheology modifier | An anionic acrylic emulsion copolymer, the emulsion containing about 28 percent solids and having a specific gravity (25° C.) of 1.106 and a pH of between about 2.1 and 4 | .6% |
| Defoamer | A petroleum-base defoamer such as 2-octanol | 0.7% |
| Ammonium hydroxide |  | 0.5% |
| Water |  | 7.6% |
| Pigment | Light blue (122.72 grams) | 3.18%. |

-continued

| Component | Generic Description | Weight % Range |
|---|---|---|
| | manufactured by Huls America Inc. of Piscataway, NJ, under designation "C-111" | |

In this example, the blending procedure set forth in General Example I is followed. In particular, the polyacrylate thickener/rheology modifier is mixed with approximately 10% of the water prior to its addition to the blend.

The formulations of the present invention are suitable for curing in the ambient. However, modest elevations in temperatures such as in the range of 38° C. to 71° C. may assist in the cure, and has been found to increase the property of water resistance.

What is claimed is:

1. A formulation for applying relatively thick films to the surface of an article and consisting of the following formulation:

| Component | Generic Description | Weight % Range |
|---|---|---|
| Acrylic emulsion | A mixture of monomers consisting essentially of 2-hydroxyethyl acrylate, hydroxypropyl acrylate, methacrylate, and acrylonitrile monomers | 65%-75% |
| Plasticizer | Dibutylphthalate. | 1%-3% |
| Coalescing agent | Dipropylene glycol methyl ether and ethylene glycol N-butyl ether | 5%-6.5% |
| Polyacrylate thickener/ Rheology modifier | An anionic acrylic copolymer containing emulsion system wherein the emulsion contains about 28 percent solids and having a specific gravity (25° C.) of 1.106 and a pH of between about 2.1 and 4 | 2.5%-3.5% |
| Dispersing agent | An anionic polymer dispersing agent utilized to deflocculate pigments in the system, when a pigment is utilized in the system and consisting essentially of the sodium salt of polymeric carboxylic acid having a specific gravity at 25° C. of 1.104 in 25% aqueous solution | .5% |
| Defoamer | A petroleum-base defoamer consisting essentially of 2-octanol | .5%-.75% |
| Surfactant | An anionic wax emulsion containing Carnauba/microcrystalline wax blend | 5%-10% |
| Pigment, as required | | 2%-10% |
| Ammonium hydroxide | | .4%-.75% |
| Water | | balance. |

* * * * *